3,737,465
BIS-METHYLOL COMPOUNDS
Robert E. Karll, Munster, Ind., and Edmund J. Piasek, Chicago, Ill., assignors to Standard Oil Company, Chicago, Ill.
No Drawing. Continuation-in-part of abandoned application Ser. No. 484,758, Sept. 2, 1965. This application Dec. 16, 1969, Ser. No. 885,653
Int. Cl. C07c 39/16
U.S. Cl. 260—619 A                4 Claims

ABSTRACT OF THE DISCLOSURE

Novel compounds having two terminal hydroxymethyl-5-alkylbenzyl substituents and having all alkyl-substituents of molecular weight upward from about 400 are obtained by a strong alkali promoted condensation of 4-alkylphenol with formaldehyde. Because of the presence of two hydroxymethyl (methylol) substituted alkylhydroxybenzyl groups, these compounds can be considered as bis-methylols since they are more reactive as diols than polyphenols. These compounds through their methylol substituents react with a compound having at least one HN< group to form novel oil soluble amine products which impart detergency-dispersancy and antioxidant properties to the oil in which they are dissolved. They also react with mono-acids to form simple diesters, with dibasic acids to form high molecular weight polyesters, with ammonia to form high molecular weight amines having secondary amino groups bridging in a chain and even terminal amino methyl groups and with alkylene di- and polyamines to form more complex oil soluble amines which as solutes impart to solvent oil anti-oxidant, detergent-dispersant properties.

RELATED APPLICATIONS

With respect to the bis-(2-hydroxy-3-methylol-5-alkylphenyl) substituted compounds, this is a continuation-in-part of our copending application Ser. No. 484,758, filed Sept. 2, 1965, and now abandoned.

BACKGROUND OF INVENTION

Resinous phenol-formaldehyde condensation products of high molecular weight and complex structure have been long known. Also 2-hydroxy-5-alkylbenzyl alcohol wherein the alkyl substituents have from 1 to about 20 carbon atoms are also known and are known to react with ammonia, primary and secondary alkylamines and diaminoalkanes. While those prior condensation products and benzyl alcohols appear to be closely related to the present inventive hydroxymethylol-alkylphenyl substituted compounds and their polyalkylene polyamine derivatives, the prior resins and benzyl alcohol and amine derivatives of the benzyl alcohols have neither the oil solubility nor the detergency-dispersancy affording properties of the present inventive compounds.

SUMMARY OF INVENTION

We have discovered the subject bis(methylol-hydroxyalkylbenzyl) compounds which have the structure:

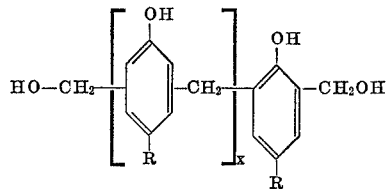

wherein $x$ is a number of from 3 to 4 inclusive and each R is the same and has a molecular weight upward from 400, suitably in the range of from 400 to about 5000 and preferably in the range of 400 to 3000. These bis-methylol compounds are soluble in middle range alkanes, e.g. alkanes having 5 to 10 carbon atoms; are soluble in mineral oils; reactive through the methylol groups with amino acids to form ester products, with dibasic saturated and unsaturated acids to form long chain saturated and unsaturated polyesters, with ammonia to produce long chain polyamines with terminal primary aminomethyl groups and internal secondary amino groups; and reactive through the phenolic hydroxy group as are phenol and alkyl-substituted phenols.

The inventive bis-methylol compounds described above can be readily prepared by reacting under condensation conditions in the presence of a strong alkali, e.g. sodium or potassium hydroxide, a high molecular weight substituted p-alkyl-substituted phenol (alkyl of upward from 400 molecular weight) and formaldehyde (e.g. formaldehyde, formalin or other formaldehyde affording compounds) in the respective molar ratio of 3.0 to 4.0:4.0 to 5.0 in the presence of a middle range alkane (above defined) at its reflux temperature. Preferably formaldehyde in slight excess of that indicated in the respective molar ratio of reactants is used to maximize conversion of the high molecular weight alkyl-substituted phenol to the bis-methylol product desired. The alkali promoter can be washed from the hexane solution of product and the product, which is of soft resinous nature, can be recovered by evaporating of or distilling off middle range alkane reaction solvent. Such removal of reaction solvent also removes unreacted formaldehyde. Any remaining unreacted high molecular weight alkyl-substituted phenol can be extracted from the middle range alkane, free of product residue.

Suitable p-alkylphenol reactants (alkyl of M.W. upward from 400) can be obtained by the alkylation of phenol with a suitable molecular weight alkyl chloride, olefin or polyolefin such as the liquid viscous polypropenes and polybutenes. Those polypropenes and polybutenes are commercial products prepared by polymerization of propylene or butenes, such as, isobutylene, butene-1, butene-2, mixtures of isobutylene, butene-1 and butene-2 as well as such mixtures of butenes with butane. The p-alkylphenols derived from such polypropenes and polybutenes are p-polypropyl and p-polybutyl-substituted phenols. Such polypropyl and polybutyl groups are mixtures of various molecular weight groups rather than a single molecular weight group. Since the polymers from which the polypropyl and polybutyl groups are derived are characterized by number average molecular weight ($\overline{M}n$), the same will be used to characterize said p-polypropyl and p-polybutyl-substituents. Desirably the p-alkylphenol has an alkyl group of a molecular weight in the range of about 400 to about 5000. Preferably this reactant is a p-polypropylphenol or p-polybutylphenol whose polypropyl or polybutyl group has a 400 to 3000 $\overline{M}n$. The p-alkylphenols wherein the alkyl-substituent has a molecular weight upward from 400 can be readily prepared by known alkylation reactions.

The present inventive bis-methylol compounds before described are oil-soluble and, because of their nuclear substituted (phenolic) hydroxy groups, provide oxidation inhibition. Thus oil solutions thereof can be used where oxidation of the oil would otherwise occur or in oil extended rubbery materials to provide an antioxidant for the rubbery material. Simple esters, for example from $C_{10}$ to $C_{56}$ fatty acids (from vegetable and animal fats and oils) and wax ester acids, of the bis-methylol compounds have the polar ester groups which can provide some surface active property in addition to the antioxidant property initially present. Such simple esters would also be oil soluble. An example of such simple ester would be the bis-stearate of the present inventive bis-methylol compounds before identified. Such simple esters can be prepared by use of the reaction product before removal of the middle range alkane reaction diluent and recovered after removal of the reaction diluent by evaporation or distillation.

Polyesters, as before mentioned, are made by reaction with a dibasic acid, for example, adipic acid, terephthalic acid or phthalic anhydride. Such polyesters are linear and are of the alkyd type. The use of tribasic acids will produce cross-linked type polyesters. For example, a resinous product can be obtained by using trimellitic acid or its anhydride with the bis-methylol compounds of this invention. Unsaturated polyesters can be made by substituting the present inventive bis-methylol compounds for the diol in the conventional unsaturated polyester preparations. The presence of the somewhat acidic phenolic hydroxy groups in said polyester products provide unique reaction cites for further modification of the resulting polyesters by acidic coupling and/or cross linking.

Oil soluble linear polyamines can be prepared from the present inventive bis-methylol compounds by condensation with an amine having two HN< groups. Illustrative of such amine reactants are; diaminoalkanes such as ethylene diamine, 1,2 or 1,3-diaminopropane and diaminohexane; 1,4-diamino cyclohexane; phenylene diamine; diaminomethyl cyclohexene or benzene; di-aminopropyl piperazine and $N_1,N_2$-alkyl analogs thereof. By regulation of molar ratios of reactants the linear amines can be methylol or amine terminated.

More complex oil soluble amine derivatives of the bis-methylol compounds of this invention are derived by condensation with polyalkylene polyamines of the formula

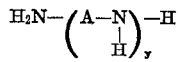

wherein A is a divalent hydrocarbon group having 2 to 8 carbon atoms and $y$ is an integer of from 2 to 10. Such polyalkylene polyamines are prepared in known manner by reacting ammonia with a dihalo-alkane (e.g. dichloro ethane or propane). Of these polyalkylene polyamine reactants there are preferred the di-, tri-, tetra-, penta-, hexa-, hepta-, octa-, nona- and deca-ethylene, tri-, tetra-, penta-, hexa-, hepta-, octa-, nona-, deca- and undeca-amines. Mixtures of such polyethylene polyamines having an average number of amino nitrogens per molecule equal to the single compound, for example, equal to the five nitrogens per molecule in tetraethylene pentamine, can be used as a source of the polyethylene polyamine reactant. Also, mixtures of tetraethylene pentamine and pentaethylene hexamine, are useful as reactants with the bis-methylol compounds of this invention.

Oil solutions containing from 0.01 to 10.0 weight percent of the foregoing amine derivatives of the present inventive bis-methylol compounds have many uses. The oil solutions of said amine derivatives can also be used in oil extended rubbery materials to provide amine type promotion of vulcanization accelerators, phenolic-amine type antioxidant and even surface active properties to aid in the incorporation of other compounding ingredients. Also such oil solutions provide detergency-dispersancy properties as well as oxidation inhibition to lubricating mineral oil. Said oil solutions can be prepared from the present inventive bis-methylol compounds by dissolving the bis-methylol compound in oil after removal of the alkane reaction diluent and then conducting the condensation reaction with the amine. Or the condensation reaction with the amine can be carried out in the alkane solution first occurring, removing the alkane reaction diluent and then dissolving the amine derivative in oil. In either case an amount of oil can be used to provide solutions having from 0.01 up to as much as 60 weight percent of the amine derivative. Solutions having upward from 10 weight percent to 60 weight percent are useful concentrates for packaging or storage for later further dilution with oil to the concentration desired for use.

Oil solutions containing 0.3 to 10 weight percent said amine, preferably polyalkylene polyamine and most preferable polyethylene polyamine, derivatives of the present inventive bis-methylol compounds are useful as lubricants for internal combustion engines when used as crankcase lubricating oils for 4-cycle gas or gasoline and diesel engines or as fuel additive for 2-cycle gasoline engines. For such use there can also be used anti-wear, anti-corrosion, lubricity improving, index viscosity improving, alkaline buffering etc. addition agents.

EMBODIMENTS OF THE INVENTION

The following examples will illustrate the bis-methylol compounds of this invention and their preparation.

EXAMPLE 1

There are combined and stirred in a reactor having a reflux condenser 168 grams (0.19 mole) p-polypropyl phenol of 894 $\overline{Mn}$ (polypropyl group of about 800 $\overline{Mn}$), 31 g. formalin (37% $CH_2O$) to provide 0.38 mole formaldehyde, 100 ml. hexane and 130 ml. of aqueous 1.5 N sodium hydroxide. The resulting stirred mixture is heated under reflux (about 158° F.) for about 16 hours. Thereafter, the resulting mixture is washed thoroughly with water to remove the caustic and the hexane is evaporated by heating the water washed solution to about 100° C. The residue, a viscous liquid at ambient temperatures contains the bis-methylol compound of about 4588 $\overline{Mn}$ having the structure before indicated wherein $x$ is 4 and each R is polypropyl of about 800 $\overline{Mn}$.

EXAMPLE 2

The method of Example 1 is repeated except the 0.19 mole of p-polypropylphenol is supplied as an 80 weight percent solution in polypropylene of about 800 $\overline{Mn}$. The washed hexane free residue with a 2410 $\overline{Mn}$ contains 19 weight percent polypropylene of 800 $\overline{Mn}$ and 81 weight percent of the bis-methylol compound of about 4588 $\overline{Mn}$ having the structure before indicated wherein $x$ is 4 and each R is polypropyl of about 800 $\overline{Mn}$. Said polypropylene can be removed from the residue by contacting it with silica gel, washing with n-hexane to remove polypropylene, extracting the bis-methylol product from silica gel with 10% isopropyl alcohol in benzene and removing the extracting solvent. The hydroxyl number found compares favorably with the hydroxyl number of said bis-methylol compound.

EXAMPLE 3

The method of Example 2 is repeated except that 0.38 mole of sodium hydroxide is used in place of 130 ml. aqueous 1.5 N NaOH, isooctane is used as the reaction solvent and the mixture is heated to 250° F. after the formalin is added and the reaction period is two hours. Iso-octane solvent is distilled from the washed solution with nitrogen gas injection into the solution. The residue obtained in this manner has about 81% of the bis-methylol compound of about 4588 $\overline{Mn}$.

EXAMPLE 4

To a reactor having a stirrer and reflux condenser there are added 1070 grams of 0.5 gram mole p-polypropylphenol of 900 $\overline{Mn}$ (polypropyl group of about 803 $\overline{Mn}$) dissolved (42%) in a mixture of 10 weight percent polypropylene (803 $\overline{Mn}$) and 90 weight percent light mineral oil, 40 grams NaOH and 200 ml. iso-octane. The resulting solution is stirred and heated while 170 g. of formalin (37% $CH_2O$) to provide 2.08 moles formaldehyde are slowly added. The reaction mixture is stirred and heated to 250° F. at which time nitrogen is injected to assist removal of iso-octane. The stirred residue is held at 300° F. for two hours. The liquid residue is filtered to remove solid NaOH. The filtrate is an oil solution containing 43 weight percent of the bis-methylol product of 3753 $\overline{M}n$ corresponding to the structure before given wherein $x$ is 3 and each R is polypropyl of 803 $\overline{M}n$.

EXAMPLE 5

To a reactor having a stirrer and reflux condenser there are added 1000 ml. iso-octane, 80 grams NaOH, 5.2 moles formaldehyde added as formalin (37% $CH_2O$) and 1.0 mole of 1140 $\overline{M}n$ p-polypropylphenol (polypropyl R group of 1047 $\overline{M}n$). The stirred mixture is heated to 250° F. and held at about 250° F. two hours. Thereafter the reaction mixture is filtered to remove NaOH. The filtrate, an iso-octane solution, so obtained contains about 0.25 mole of the bis-methylol corresponding to the structure before given wherein $x$ is 3 and each R is polypropyl of 1047 $\overline{M}n$. The bis-methylol solute product has a 4656 $\overline{M}n$.

EXAMPLE 6

The method of Example 5 is repeated except 1.0 mole 635 g. of oil solution containing 80 weight percent 508 $\overline{M}n$ p-polypropylphenol (polypropyl group of 415 $\overline{M}n$) and 1000 ml. of heptane as reaction solvent is employed and the reaction is conducted at 205° F. for four hours. In this way (the filtrate) a heptane solution of the bis-methylol product, wherein $x$ is 3 and R is polypropyl of 415 $\overline{M}n$, of 2128 $\overline{M}n$ is obtained.

EXAMPLE 7

The method of Example 5 is repeated except that 1.0 mole of p-polybutylphenol of 2128 $\overline{M}n$ is used. In this way there is obtained a heptane solution filtrate of the bis-methylol product of 8608 $\overline{M}n$ wherein $x$ is 3 and each R is polybutyl of 2035 $\overline{M}n$.

EXAMPLE 8

The method of Example 4 is repeated except that 0.5 mole of p-polybutylphenol of 3081 $\overline{M}n$ (polybutyl group of 2988 $\overline{M}n$) is used. In this way iso-octane solution is obtained of the bis-methylol product of 12,420 $\overline{M}n$ wherein $x$ is 3 and each R is polybutyl of 2988 $\overline{M}n$.

EXAMPLE 9

A solution as obtained by Example 6 is reacted with ammonia by injecting it into the filtrate stirred and maintained at 225° F. The gaseous mixture from the reaction is conducted through a condenser, the condensate collected, the heptane layer is returned to the reaction and the water layer is discarded. The reaction is conducted until three moles ammonia are reacted per mole of bis-methylol compound in solution. Thereafter the heptane solvent is distilled off aided by nitrogen injection into the liquid in the distillation flask. In this manner bis-methylol compound is converted to a polyamine having an internal secondary amino, —NH— group, terminal amino methyl nuclear substituents and a nitrogen content of about 0.8%.

EXAMPLE 10

To the solution obtained by Example 6 are added 30 (0.5 mole) grams ethylene diamine stirred and heated to 250° F. for four hours and thereafter the heptane is distilled off with nitrogen gas injection into the liquid. The residue is dissolved in 560 grams of SAE–5W oil and heated with stirring to 340–350° F. for two hours while nitrogen gas is injected to insure substantially all of the by-product water of the condensation reaction had been removed. The solution is filtered. The oil solution filtrate contains about 1.15% nitrogen.

EXAMPLE 11

The 2128 $\overline{M}n$ bis-methylol compound of Example 6 is recovered as a residue by distilling off the heptane. To 0.25 mole (665 grams) thereof there is added SAE–5W oil in an amount of 400 grams. This mixture is stirred until the bis-methylol compound dissolves at ambient temperature and then 0.5 mole of dioctyl amine is added to the stirred solution. This mixture is vigorously stirred and heated to 250° F. for six hours and then to 350° F. with nitrogen injected into the liquid to aid in removal of by-product water. The product is an oil solution of the N-dioctyl derivative of the bis-methylol of the described structure wherein $x$ is 3 and R is 508 $\overline{M}n$ polypropyl and the —N—$(C_8H_{17})_2$ groups replace the —OH groups of each methylol and the nitrogen is directly attached to the carbon of the terminal nuclear methylene substituents. The solution has a nitrogen content of about 0.59% and about 55% of said bis(N-dioctyl) derivative of said bis-methylol compound.

EXAMPLE 12

Fifty grams of the product of Example 1 is combined with 2.0 ml. of tetraethylene pentamine, the resulting mixture is stirred and heated to 340–350° F. for about four hours. Thereafter the product is cooled to about 200° F. washed with water to remove unreacted tetraethylene pentamine then dissolved in hexane and the hexane removed by distillation. The resulting product is found to contain 0.69% nitrogen.

Two kerosene solutions are prepared; the first having 0.5 weight percent of the product of Example 1 and the second having 0.5 weight percent of the product of Example 12. To each kerosene solution was added 4.0 grams of carbon black. The solutions were shaken and permitted to stand for 24 hours. The first solution did not retain the carbon black in suspension. The second solution retained carbon black in suspension.

A solution in SAE–10W lubricating oil containing 5.0 weight percent of the product prepared as described in Example 12 is mixed with sludge taken from the valve cover of an overhead valve gasoline engine in an amount of 3 grams of sludge per 100 grams of solution. The sludge is suspended in the oil as the uniform dark color of the mixture indicates. The sludge suspension remains substantially uniform for about 24 hours.

EXAMPLE 13

To a product prepared as described in Example 4 but in 4 fold excess and containing 0.5 mole of the bis-methylol product ($x$ is 3 and R is 803 $\overline{M}n$ polypropyl) there are added at ambient temperature 100 grams of tetraethylene pentamine and 100 ml. of formalin (37% $CH_2O$). The mixture is stirred and rapidly heated to a temperature of 350° F., then nitrogen is injected into the stirred hot liquid (350° F.) for about two hours to aid in the removal of condensation by-product water. The resulting hot liquid product is filtered and combined with SAE–5W oil to provide a solution containing 1.02% nitrogen. The formaldehyde was used for the unreacted polypropylphenol to convert it to its high molecular weight Mannich condensation product.

The product of Example 13 is used in an oil formulation which is subjected to test as crankcase lubricant in the Caterpillar Diesel Engine Test 1–H for 240 hours. The oil formulation is prepared by mixing on a volume percent basis:

| | Percent |
|---|---|
| SAE–20 oil | 60.3 |
| SAE–40 oil | 32.0 |
| Product of Example 13 (1.02% N) | 4.5 |
| Oil solution (40%) zinc dialkyl dithiophosphate | 0.7 |
| Oil solution (40%) magnesium sulfonate | 1.5 |

Following the 240 hour engine test, the test engine pistons were inspected for deposit formation. Top (first) ring groove carbon filling was 10% (30% is acceptable), second ring groove had no carbon but a 30% lacquer coating, the third and fourth ring grooves were clean, the first two lands had light lacquer coatings, the third and fourth lands showed traces of lacquer coating (surfaces were lightly dulled) and the upper crown had only a light amber lacquer coating.

EXAMPLE 14

A 50 weight percent solution of bis-methylol product of the structure before shown wherein $x$ is 3 and R is polybutyl of 1100$\overline{Mn}$ having a $\overline{Mn}$ of 4876 in SAE–5W oil containing 0.6 mole of said bis-methylol product is combined with 0.85 mole of tetraethylene pentamine (TEPA). The resulting mixture is stirred and heated to 360° F. and held at 350–360° F. for 3 hours while nitrogen is injected into the solution to aid removal of by-product water. The resulting solution is cooled to 250° F. and is filtered. The filtrate contains about 0.93% nitrogen from the polyamino product solute whose molecule contains three of the bismethylol moieties bridged by two TEPA moieties and two terminal TEPA moieties replacing the OH group of otherwise terminal methylol groups.

EXAMPLE 15

The bis-methylol compound described in Example 14 and TEPA are combined in the respective molar ratio of 1.0:2.0 making use of 292 grams of 50% solution (0.03 mole of bis-methylol) and 0.06 mole TEPA. The resulting product contains 1.2% nitrogen and 52 weight percent of the product of the structure before shown wherein $x$ is 3 and R is 1100 $\overline{Mn}$ polypropyl and the hydroxyl of each terminal methyl group is replaced by

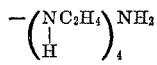

What is claimed is:

1. A bis-methylol compound having the structure:

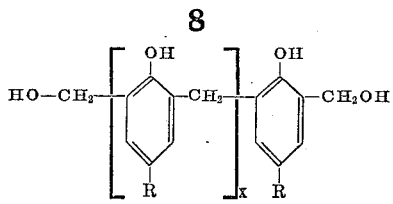

wherein $x$ is 3 to 4 inclusive and R is an alkyl group having a molecular weight within from 400 to 3000.

2. The compound of claim 1 wherein R is a polypropyl or polybutyl group having a 400 to 3000 $\overline{Mn}$.

3. The compound of claim 2 wherein R is polypropyl having an 800 $\overline{Mn}$.

4. The compound of claim 2 wherein R is polybutyl having a 1140 $\overline{Mn}$.

References Cited

UNITED STATES PATENTS

| | | | |
|---|---|---|---|
| 3,151,096 | 9/1964 | Kordzinski et al. | 260—619 AX |
| 1,996,069 | 4/1935 | Honel | 260—4 |
| 2,544,818 | 3/1951 | Axe | 260—624 R |
| 2,868,823 | 1/1959 | Kluge et al. | 260—624 R |

FOREIGN PATENTS

| | | | |
|---|---|---|---|
| 481,909 | 3/1938 | Great Britain | 260—624 C |

BERNARD HELFIN, Primary Examiner

U.S. Cl. X.R.

252—51.5, 404, 403; 260—410.5, 47 C, 570 R, 268 PL